No. 706,453. Patented Aug. 5, 1902.
W. B. RIGNALL.
CONVERTIBLE BICYCLE REST.
(Application filed Nov. 18, 1901.)
(No Model.)
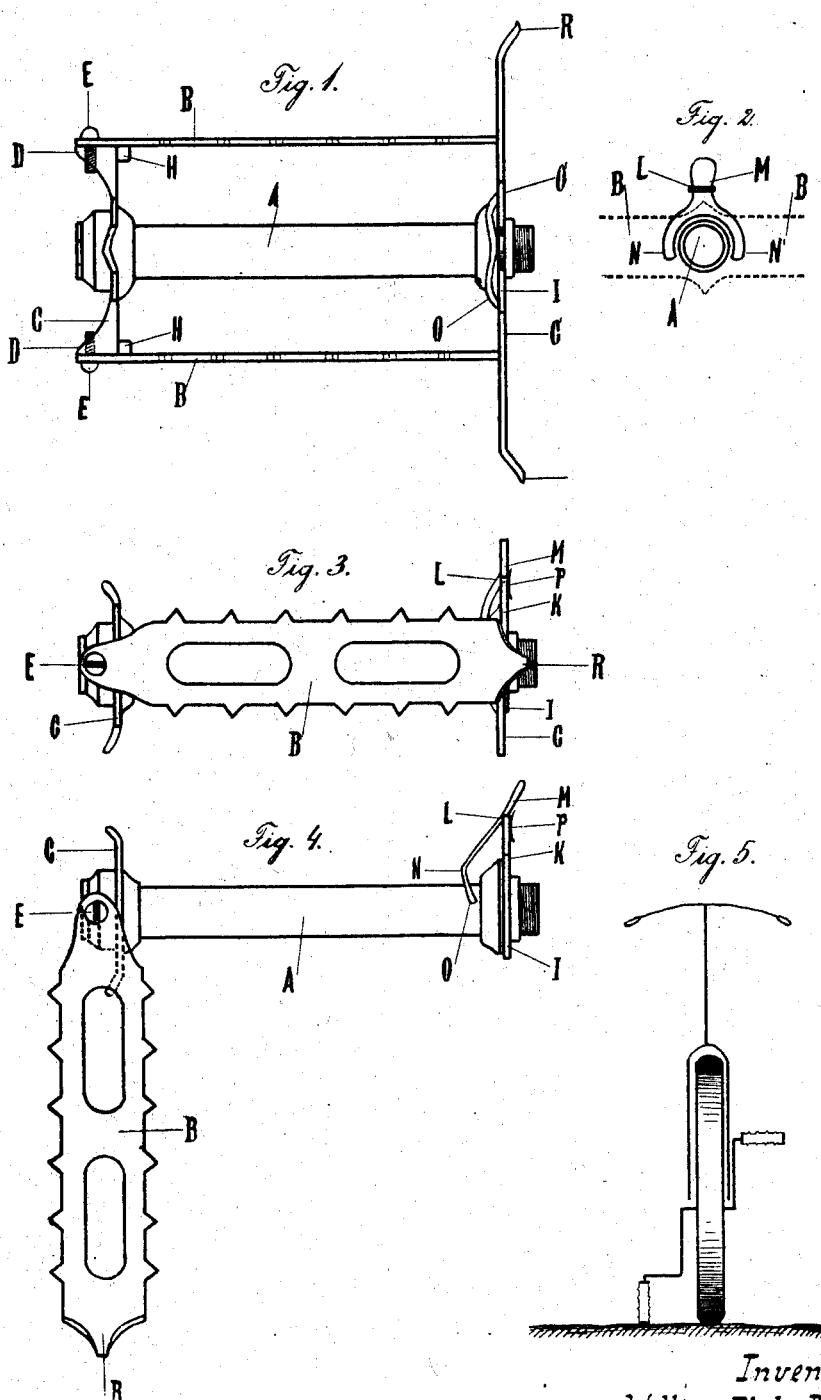
Witnesses
William Miller
Chas. E. Prenger
Inventor
William Blake Rignall
By W. C. Hauff
Attorney

UNITED STATES PATENT OFFICE.

WILLIAM BLAKE RIGNALL, OF EDINBURGH, SCOTLAND.

CONVERTIBLE BICYCLE-REST.

SPECIFICATION forming part of Letters Patent No. 706,453, dated August 5, 1902.

Application filed November 18, 1901. Serial No. 82,736. (No model.)

*To all whom it may concern:*

Be it known that I, WILLIAM BLAKE RIGNALL, a subject of the King of Great Britain and Ireland, residing at Edinburgh, Scotland, have invented a new or Improved Convertible Bicycle-Rest, (for which I have obtained a British patent, No. 12,803, dated June 24, 1901,) of which the following is a specification.

The object of this invention is a convertible bicycle-rest absolutely unknown up to the present and constituted by the pedal of the machine itself. This pedal can be lowered or raised at will around the outside extremity of its axle and when lowered rests on the ground, thus affording an immutable support to the bicycle.

In order that my invention may be more clearly understood, reference is made to the annexed drawings, in which—

Figure 1 is a plan view of the pedal. Fig. 2 is a detailed view of the spring-catch. Fig. 3 is a side view of Fig. 1. Fig. 4 is a side view showing the position of the pedal when lowered; and Fig. 5 is a front view, on a smaller scale, of a bicycle held at rest by the lowered pedal.

In all the figures the same letters of reference indicate corresponding parts.

A is the axle of the pedal.

B B are the saw or toothed branches of the pedal. These branches are held at each extremity by supporting-plates C C'. The supporting-plate C is terminated at each end D D by bosses in which screws or pins E E are engaged, the branches B B turning freely thereon. Catches H H are fixed on the branches B B, so as to maintain the said branches in an upright position when they have turned around the pins E E. The supporting-plate C' is integral with the branches B B, but envelop only the lower part of the axle. At the place at which the plate C' envelops the axle a collar I is solidly soldered or otherwise fixed on the tube of the axle and engaging with the supporting-plate C'. This collar has at its upper part a vertical blade K, made integrally therewith. A lever M pivots on this blade, terminated at its lower part by two branches N N', which are riders to the axle A and each having a tooth O O', engaging in recesses in the plate C', when this plate envelops the collar I, and consequently maintains the whole pedal in its place. The lever M is firmly held in place by a spring P to prevent any chance deviation from the pedal.

My invention works as follows: When it is required to maintain the bicycle at rest in an upright position, the articulated pedal is brought down to its lowest position—that is, as near the ground as possible. Then the lever M is pressed so as to force out the teeth O O' from the recesses in the supporting-plate C'. The pedal then turns by its own weight around the pins E E till it is stopped by the catches H H. At this moment it is in an upright position, (see Fig. 4,) and the bicycle has only to be inclined to the same side as the pedal to be firmly held upright. The plate C' is terminated at each end by curved parts R R, which bite the ground and prevent any backward or forward movement.

I have described a way of freeing the pedal, but I do not limit myself to any particular disposition. Any other suitable arrangement will answer the purpose. Similarly this disposition is applicable to pedals, whether ordinary pedals, rubber pedals, or rat-trap pedals.

What I claim is—

1. In a bicycle-rest, the combination with a pedal shaft or axle and a supporting-plate at the outer end thereof, of a pedal-frame pivoted to said plate and adapted to swing downwardly to constitute a support for the bicycle, a plate fixed to and connecting the parallel members of said frame at their inner ends having a recess therein adapted to embrace the under side of said axle, an upright secured to the bearing-sleeve of the pedal on said axle, and a spring-actuated retaining device fulcrumed on said upright and provided with engaging portions adapted to coöperate with the latter plate for retaining said pedal-frame in raised position, said pedal-frame being of such length that the plate on its free end will reach to the ground when swung downwardly.

2. In a bicycle-rest, the combination with a pedal shaft or axle and a supporting-plate at the outer end thereof, of a pedal-frame pivoted to said plate and adapted to swing downwardly to constitute a support for the bicycle, a plate connecting the parallel members of said frame at their inner ends having a recess therein adapted to embrace the under side of said axle, an upright secured to the bearing-sleeve of the pedal on said axle, a lever fulcrumed in said upright having a forked lower end, the branches of which straddle said axle and are provided with engaging portions which coöperate with the latter plate for retaining said pedal-frame in raised position, and a spring acting upon said lever for holding it in operative position.

In testimony whereof I have hereunto set my hand in the presence of two subscribing witnesses.

WILLIAM BLAKE RIGNALL. [L. S.]

Witnesses:
CARLETON JACKSON FLEMING,
JAMES WILSON.